United States Patent
Valecha et al.

(10) Patent No.: US 12,283,121 B2
(45) Date of Patent: Apr. 22, 2025

(54) VIRTUAL REALITY OBJECT TAG PRESENTATION

(71) Applicant: International Business Machines Corporation, Armonk, NY (US)

(72) Inventors: Vinod A. Valecha, Pune (IN); Partho Ghosh, Kolkata (IN); Saurabh Yadav, Bangalore (IN); Amrita Maitra, Pune (IN)

(73) Assignee: International Business Machines Corporation, Armonk, NY (US)

( * ) Notice: Subject to any disclaimer, the term of this patent is extended or adjusted under 35 U.S.C. 154(b) by 367 days.

(21) Appl. No.: 17/549,623

(22) Filed: Dec. 13, 2021

(65) Prior Publication Data

US 2023/0186660 A1    Jun. 15, 2023

(51) Int. Cl.
| | | |
|---|---|---|
| *G06V 20/70* | (2022.01) | |
| *G06F 40/40* | (2020.01) | |
| *G06V 20/20* | (2022.01) | |
| *H04L 9/40* | (2022.01) | |

(52) U.S. Cl.
CPC ............. *G06V 20/70* (2022.01); *G06F 40/40* (2020.01); *G06V 20/20* (2022.01); *H04L 63/101* (2013.01); *H04L 63/102* (2013.01)

(58) Field of Classification Search
CPC ........ G06V 20/70; G06V 20/20; G06V 20/30; G06F 40/40; G06F 40/20; G06F 40/279; G06F 40/284; G06F 3/011; G06F 16/176; G06F 21/54; G06F 21/6245; G06F 21/60; H04L 63/101; H04L 63/102; G02B 2027/0178
See application file for complete search history.

(56) References Cited

U.S. PATENT DOCUMENTS

| | | | |
|---|---|---|---|
| 10,484,508 B2 | 11/2019 | Clement | |
| 2010/0058208 A1 | 3/2010 | Finn | |
| 2017/0262154 A1* | 9/2017 | Black | G06F 3/012 |
| 2018/0322704 A1 | 11/2018 | Dillavou | |
| 2020/0184087 A1* | 6/2020 | Nos | G06F 16/907 |
| 2020/0302699 A1 | 9/2020 | Cantor | |

(Continued)

FOREIGN PATENT DOCUMENTS

| | | |
|---|---|---|
| EP | 3161772 A1 | 5/2017 |
| EP | 3502866 A1 | 6/2019 |

OTHER PUBLICATIONS

Krestel; "Personalized Topic-Based Tag Recommendation"; Jan. 2012.

(Continued)

*Primary Examiner* — Andrew M Moyer
*Assistant Examiner* — Ahmed A Nasher
(74) *Attorney, Agent, or Firm* — Daniel J. Blabolil

(57) ABSTRACT

The present specification describes a computer-implemented method. According to the method, user-specific tags are generated for a virtual reality (VR) object displayed within a VR environment. The user-specific tags are generated based on an interaction of a first user with the VR object. Role-based access rights are assigned to the user-specific tags. A role of a second user accessing the VR environment is determined and the user-specific tags are presented to the second user, alongside the VR object, based on a comparison of the role of the second user and the role-based access rights.

14 Claims, 6 Drawing Sheets

(56) References Cited

U.S. PATENT DOCUMENTS

2020/0401802 A1    12/2020  Grant
2021/0399911 A1*  12/2021  Jorasch ............... H04L 12/1822
2022/0374460 A1*  11/2022  Yu ......................... G06N 20/00

OTHER PUBLICATIONS

"Method and System for Artificial Intelligence (AI)-Enabled Virtual Reality (VR) Gamification-Based Content Alignment Among Multiple Collocated Users in Any Collaborative Physical Activity"; IP.com; May 25, 2021.

Wei et al; "Research and Application of Access Control Technique in 3D Virtual Reality System OpenSim"; Oct. 2013.

IBM Institute for Business Value, "Turn input into impact with an AI-led marketing strategy," IBM [online], [accessed on Mar. 15, 2024], 13 pages, Retrieved from the Internet: <URL: https://www.ibm.com/thought-leadership/institute-business-value/report/ai-marketing-strategy>.

* cited by examiner

VIRTUAL REALITY OBJECT TAG PRESENTATION

BACKGROUND

The present invention relates to virtual reality systems, and more specifically to the tagging, sharing, and presenting of tags associated with virtual reality objects.

SUMMARY

According to an embodiment of the present invention, a computer-implemented method is described. According to the computer-implemented method, user-specific tags are generated for a virtual reality (VR) object displayed within a VR environment. The user-specific tags are generated based on an interaction of a first user with the VR object. Role-based access rights are assigned to the user-specific tags and a role of a second user accessing the VR environment is determined. Based on a comparison of the role of the second user and the role-based access rights, the user-specific tags are presented to the second user alongside the VR object.

The present specification also describes a system. A tag generator of the system generates user-specific tag for a VR object that a first user is interacting with. An access rights controller assigns a role-based access right to the user-specific tag and determines a role of a second user accessing the VR environment. A display controller presents the user-specific tags alongside the VR object to the second user, based on a comparison of the role of the second user and the role-based access rights.

The present specification also describes a computer program product. The computer program product includes a computer readable storage medium having program instructions embodied therewith. The program instructions are executable by a processor, to cause the processor to generate a user-specific tag for a VR object that a first user is interacting with, the user-specific tag being based on the interaction. The program instructions are executable by a processor, to cause the processor to assign role-based access rights to the user-specific tag and determine a role of a second user of the VR environment. Responsive to authentication of the second user, the program instructions are executable by a processor, to cause the processor to present the user-specific tag associated with the VR object alongside the VR object in the VR environment.

DETAILED DESCRIPTION

Figure 1:
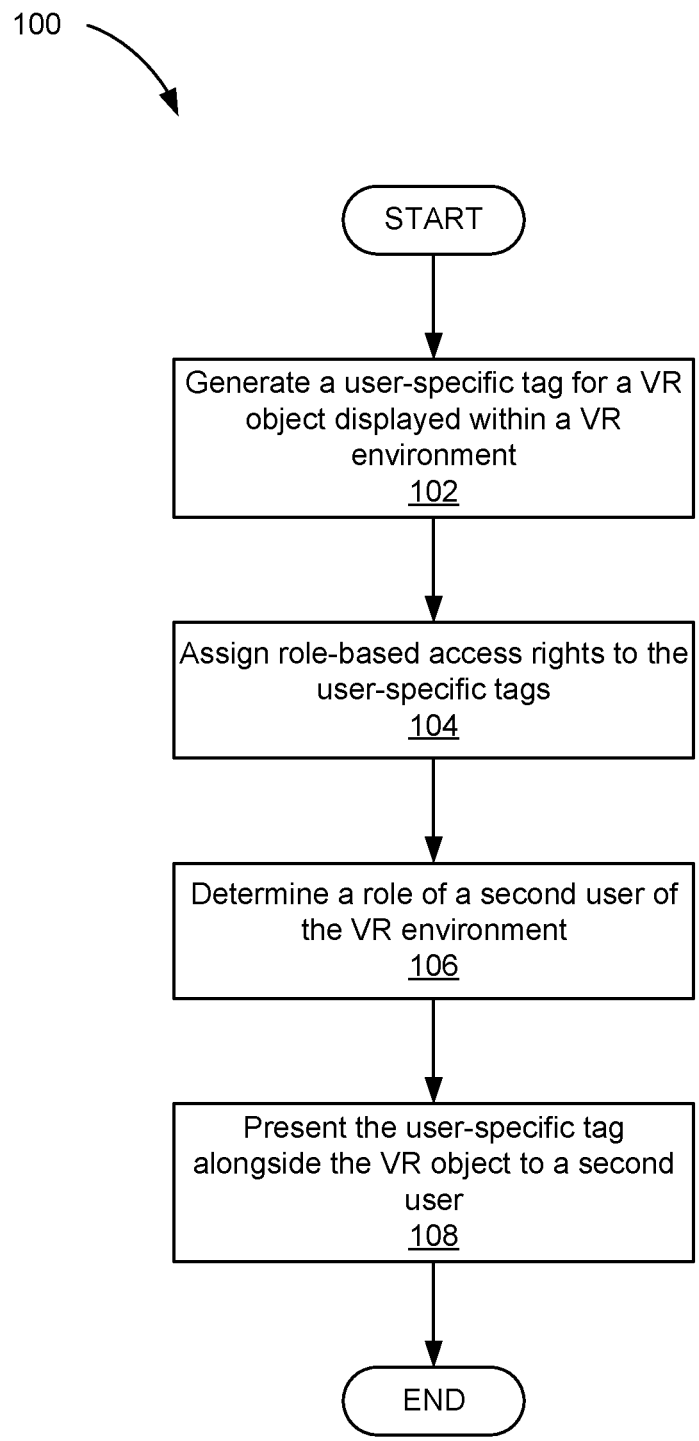
FIG. 1 depicts a computer-implemented method for generating and presenting virtual reality object tags, according to an example of the principles described herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Virtual reality (VR) systems are systems that create a virtual environment that a user of the VR system may interact with. For example, a user may don a VR headset which may display a virtual environment such as a landscape, room, or other space on a screen of the VR headset. The VR system may also generate VR objects within the VR environment. The user may interact with these VR objects. For example, in a VR automobile showroom, various computer graphic automobiles may be generated that the user may walk around and view from different angles. The user may interact with these VR objects as well, for example by lifting the hood of the VR automobile or opening the door of the VR automobile. While particular reference is made to a particular VR environment, a VR system may generate and display any variety of VR environments with any variety of VR objects that the user may interact with.

VR provides an exciting and new medium for communicating and collaborating with other users. VR has evolved and expanded into many industries. For example, it is not uncommon to see VR systems in industries ranging from hospitality, medical care, transportation, and space exploration. This is due to the ability of VR systems to provide users with direct access to objects in the VR space. This direct access has led to technological breakthroughs, greater understanding, and increased creative collaboration.

Some advancements to VR systems may further solidify their place role in day-to-day life. Accordingly, the present specification enables the generation of multifarious metadata tags which are juxtaposed with the VR objects to which they are associated. Such tags may relate to the real-world object that the VR object represents, user interactions with the VR objects, a context of the interaction between the user and the VR object, and environmental conditions associated with the VR objects, among others. That is, while a user may interact with objects within the VR space, the user may not have access to the experiences and insights of other users who have associated with those same VR objects. For example, an automotive engineer may be analyzing a particular automobile and discover something related to the operation of the engine. Another automotive engineer at another point in time, may enter the VR space and interact with the engine as well. Without the advantage of the first engineer's insight, the second engineer may be ineffective by, for example, performing the same analysis or drawing the same conclusion. Moreover, it may the case that the notes of the first engineer are not visible within the VR environment such that the second user would have to remove the VR headset and manually access the notes of the first engineer. In other words, the metadata associated with a particular VR object, that is the tags that are indicative of another user's interaction with the VR object, is not leveraged for other users of the VR system. Accordingly, the present specification enables multifarious tags associated with the interaction of a first user with one VR object to be presented and displayed to a second user at a different point in time. As described above, the tags may relate to virtual object properties, associated real object properties, the type of user interaction, audio, object, smell, gestural, touch, environmental, security-related, contextual, and/or situational characteristics of the object. Note that while particular reference is made to particular characteristics captured by VR tags, different types of data and different types of tags may be implemented in accordance with the principles described herein.

In the present specification, these tags are overlaid on top of the VR objects when a second user access the VR environment from a different, or the same, VR system. For example, upon entering the VR automotive showroom, a tag may be displayed that overlays the engine that the first engineer was working on. Accordingly, the second engineer may access the insights of the first engineer, thus facilitating a greater collaborate environment when analyzing the automotive engine.

As such, the present specification provides for enhanced collaboration between different users interacting with VR objects in a VR environment. This is accomplished via intelligent tagging of the VR object and associating the tags with the VR objects to which they pertain. In one example, the tags may be secured via role-based authentication such that specified users that are intended and allowed to have access to the tags may see the tags. For all other users, the tags may be hidden in the VR environment. In yet another example, the tags may be specific to the user and/or organization with which the user is affiliated. For example, within a VR environment of a medical facility, tags associated with medical items may be presented to medical professionals such as doctors or nurses while tags associated with accounting items may be presented to accountants and financial personnel.

As used in the present specification and in the appended claims, the term "a number of" or similar language is meant to be understood broadly as any positive number including 1 to infinity.

FIG. 1 depicts a computer-implemented method (100) for generating and presenting VR object tags, according to an example of the principles described herein. According to the method (100), the system and more particularly a tag generator may generate (block 102) user specific tags for a VR object that is displayed within the VR environment and which is the subject of an interaction by the first user. That is, within the VR environment, there are a number of digitalized or virtual representations of objects. As described above, a user may interact with these objects. In so doing, the user may identify features, or characteristics, of the VR objects that are based on that user's specific interaction with the VR object. Accordingly, these user interactions may be tracked and incorporated into a tag that is to be associated, and presented, alongside the VR object.

In general, the tag may refer to metadata that is associated with a VR object. The tag may include various pieces of information. Examples of interaction-based data that may be included in a user-specific tags are presented below.

As a first example, the tag may include information related to the VR object including but not limited to appearance, animation, and VR object components. In another example, a tag may include information related to the real object, physical environment, activities in the physical environment such as real object overlay, interactions with the object, and real-world object properties. As yet another example, a tag may include information pertaining to the user interactions, real and VR collaborations, techniques, activities, usage criterion, and guidance associated with the VR object including but not limited to the type of interactions and mode of interactions. As yet another example, a tag may include information pertaining to security protocols in the real and virtual environments. As yet another example, a tag may include information pertaining to the audio aspects for the interactions, activities and metadata of the physical and virtual environments. As yet another example, a tag may include information pertaining to smell aspects for the interactions, activities, and metadata of the physical and virtual environments. As yet another example, a tag may include information pertaining to gestural aspects for the interactions, activities, and metadata of the physical and virtual environments. As yet another example, a tag may include information pertaining to the domain and/or platform for the interactions, activities, and metadata of the physical and virtual environments. As a specific example, for a musical instrument VR object, the tag may identify the VR object as a musical instrument, and may include tags indicating a review, quality, or nature of the musical instrument. In yet another example, the system may identify smell characteristics for the VR object. For example, a user may tag a VR food item with a particular smell, such as that of freshly baked bread. While particular reference is made to particular interactions/observations that may be captured, the method (100) may generate (block 102) any variety of tags.

As described above, the tags may be user-specific. That is, they may capture the interactions of a particular user with the object. For example, as described above, the tag related to an automobile engine may be generated based on a first engineer's interaction with the engine. In addition to being specific to the user, the tag may be specific to an organization to which the first user, and the second user, pertain. Including organization-specific information in a tag may be used to determine which users are permitted, or denied, access to the tags. Still further, the tags may be further specific to the VR environment. For example, within a financial services VR environment, certain tags may be specific to that financial services industry such that other tags are not visible, or the format of the tag is generated based on the industry.

The tags may indicate characteristics of the VR object. For example, in a gaming VR environment, a first user may provide details regarding a piece of equipment, such as its weight, size, etc. In another example, the user may provide an opinion of the equipment. In this example, the tag may indicate an opinion that the first user has of the VR object. All this is to illustrate that the tag may include any variety of information and may be user-specific. That is, it may be based on specific interactions of the first user with the VR object. As will be demonstrated below, this information may be visually overlaid such that a second user may see and leverage the observations/interactions of the first user.

The generation (block 102) of the user-specific tags may occur in any number of ways. For example, generating (block 102) the user-specific tags may be based on user input of the user-specific tag. That is, as a user interacts with the VR object, they may input the tag that is representative of their interaction with the VR object. In other examples, the characteristic may be input automatically. For example, a user may be collaborating with another user while exploring an automobile engine. In this example, the users may be conversing. In this example, a natural language processor may capture the interactions between the user and identify keywords that indicate the characteristic of the automobile. For example, via keyword identification, the natural language processor may determine that the user feels the automobile engine is getting too hot. Accordingly, this characteristic of the engine overheating may be identified and incorporated as a tag of the VR object. In some examples, different tags for a VR object may be generated based on manual input while other tags associated with the VR object may be generated automatically by the system.

The tag may be generated (block 102) based on a profile of the first user. For example, a first user may be a doctor and may be in a VR environment that displays a number of virtual medical devices. Accordingly, the tag may identify the domain of the tag as a "doctor" domain such that presentation of the tag may be accessible by other users who are also within the doctor domain. As another example, another user may be a lab technician and may access the same VR environment with medical devices. In this example, the tags that are generated (block 102) may be associated with the domain of "lab technician." Such a profile association may guide presentation of the tags to other VR users. That is, generation (block 102) of the user-specific tag may be based on a profile of the first user and presentation (block 108) of the user-specific tag may be based on a profile of the second user. For example, it may be that tags associated with the doctor domain are prevented from being displayed to those users associated with the lab technician domain.

While particular reference is made to domain-based generation and presentation of tags is described, other features of a user profile may also be associated with the observations including, but not limited to, demographic information, organizational information such as hierarchical position within an organization etc. Accordingly, in this example, the system may access a profile of the first user for which the user-specific tag is generated and a profile of the second user that is subsequently accessing the VR environment and identify a domain, or other profile characteristic, and generate/present the user-specific tag based on the identified profile feature.

The method (100) includes assigning (block 104) role-based access rights to the user-specific tags. That is, it may be desirable to secure the information contained in a tag to a subset of users of the VR environment. This may be accomplished via role-based access rights. As described above, the role-based access rights may be based on a domain of the first user and the second user. As used in the current application and appended claims, the term domain refers to a position of the user and/or a field of the user. For example, users who have a similar title, such as department manager, may be in the same domain. As another example, users who have a profile field indicating their involvement with a particular product may be said to be in the same domain. Domain and role-based access ensures that tags that are presented are relevant to the second user. For example, tags related to automobile performance may not be relevant to an accountant at an automobile manufacturer. Accordingly, the domain and role-based access rights alter the display of the tags to present those that are relevant to the user, thus increasing the efficiency of the VR display. Moreover, doing so provides an enhanced VR interface as tags that are irrelevant for a particular user are hidden from that user. Still further, it may be the case that the shear quantity of VR tags in a given virtual environment may overwhelm a user and the VR system that generates and displays the VR environment. Accordingly, role-based presentation and access of VR tags reduces processing bandwidth and increases throughput. Still further, domain and role-based access rights ensures the security of collaborative information by limiting access to the tags to just those individuals who are associated with the nature of the tags.

In an example, the role-based access rights are assigned based on a relationship between the first user and the second user. For example, the second user may be a supervisor of the first user. As such, based on this relationship, user-specific tags generated (block 102) based on interactions of the first user may be visible to the second user. In this example, a user without a relationship with the first user may be prevented from viewing such tags.

As with the user-specific tags, the role-based access rights may be assigned (block 104) based on user input. For example, a user may manually enter those users, or characteristics of those users, that are allowed to view their user-specific tags. That is, the system may receive from the first user, an indication of users that are allowed to access the user-specific tags for the first user. In another example, assignation (block 104) of the role-based access rights may be based on natural language processing. That is, a natural language processor may analyze spoken or typed input to determine whether or not a particular role should have access to a user-specific tag. For example, while a first user is analyzing a particular VR object, the first user may make the statement, "we should show our findings to our manager Jim." In this example, the system may identify from an organizational database an individual with the name of Jim who is a manager of the first user and provide this manager with role-based access to the findings of the first user.

As another example, the role-based access rights may be assigned (block 104) via analysis of an organizational chart. That is a database may include a chart which indicates a hierarchical structure for an organization. In this example, those individuals who are under supervision of a manager may see user-specific tags generated by the manager. In another example, a manager may see the user-specific tags generated for the individuals supervised. While particular reference is made to examples where a hierarchical structure of an organization triggers the role-based access rights, role-based access rights may be generated based on a hierarchical structure as well. Accordingly, as described herein, the system may identify in any number of ways, those roles who are intended to have access to user-specific tags generated for other users, and assigns access rights to those user-specific tags based on those roles.

The method (100) may include determining (block 106) a role of a second user accessing the VR environment. As described above, each user may have a role, which may be defined in their profile or other metadata, that determines whether they are allowed to view certain user-specific tags. Accordingly, the system determines the role of a user, by for example analyzing the profile or other metadata associated with the second user to determine whether the role of the second user allows them to access the specific user-specific tags.

A comparison is then made between the role of the second user and the role-based access rights. Based on a comparison of the role of the second user and the role-based access rights, the user-specific tags are presented (block 108) to the second user alongside the VR object. For example, responsive to the second user being identified as a user allowed access to a user-specific tag, the user-specific tag is presented (block 108) within the VR environment. By comparison, responsive to the user being identified as a user not allowed access to a user-specific tag, the user-specific tag is hidden within the VR environment.

That is, each VR object may include a tag, which may trigger presentation of a visual marker presented alongside the VR object within the VR environment. These tags may be used to provide a visual indicia to a subsequent user that there are tags of previous users that may be relevant. Accordingly, the user-specific tags are associated with the VR object, such that when the VR object is presented in the same VR environment, the second user has access to the user-specific tags generated by the first user. For example, the visual indicia such as an icon may be presented alongside the VR object to indicate to the subsequent user of the first user user-specific tags. In some examples, the tag may be presented (block 106) to the second user at a later point in time than when the first user is accessing the VR environment. Thus, rather than requiring both users to be within the VR environment at the same time, the present method (100) shares the tags when users are in different time frames.

As with the identification of the observations, presentation (block 108) of the user-specific tags may also be based on the profile and/or domain of the second user. That is, a particular VR environment may include a variety of different VR objects. Different users within the VR environment may have interactions that are particular to their domain or profile. For example, a product development technician may have certain interactions relating to a particular product that he is developing while a marketing director may have different interactions relating to the same product. In this example, interactions by the product development technician may be hidden from the marketing director as the marketing director has a different domain than the product development technician. In some examples, the visibility of tags that are not associated with the domain and profile of the first user or the second user may be selected by either the first user or the second user. For example, the first user may establish certain role-based access rights which may prevent or allow those from outside of certain domains from viewing the associated tags. In another example, the second user may establish a preference to see or not see tags that are outside of their domain.

Another example of presentation of user-specific tags based on user preference is provided. In this example, the user may be in an automotive racing VR gaming environment and may have a preference for vehicles that have quick acceleration. In this example, the system may identify those user-specific tags that relate to the acceleration of the different vehicles and may present those, while blocking other tags.

In some examples, visual indicia associated with the user-specific tags may be presented once the VR object enters the view of the user. For example, as a particular automobile enters the view of a second user, the visual indicia associated with a tag may be displayed on the VR display. In some examples, the visual indicia may include user input elements to expand or collapse a window whereon the interactions and tag are displayed.

In either case, the present specification provides for the intelligent generation and presentation of tags alongside VR objects, which tags indicate user-specific observations relating to the associated VR objects. That is, more and more content is generated by users. That is, these user-specific tags may be used in search queries to identify information of interest to other users. That is, text-based queries may rely on the information in these tags to retrieve information for a user. Given that the present method (100) describes intelligent tag generation and the role-based control of access to the information associated with the tags, the present method (100) provides enhanced searchability and efficacy in information retrieval. The role-based access rights also protect and secure the information associated with a tag and prevents VR displays overloaded with tags from users. As such, according to the present disclosure, a tagged object may be viewed by another user of the VR system in a controlled way.

Further, the association of user-specific tags to the VR objects may enable additional collaboration between various users by providing intelligent contextual searches, filters, and sorting of virtual objects based on the user-specific tags. As a particular example, a tagged object may be an input to provide a suggestion to users within the same organization. The method (100) also provides for NLP-based description generation of virtual objects and associations with user preferences and situational context.

Figure 2:
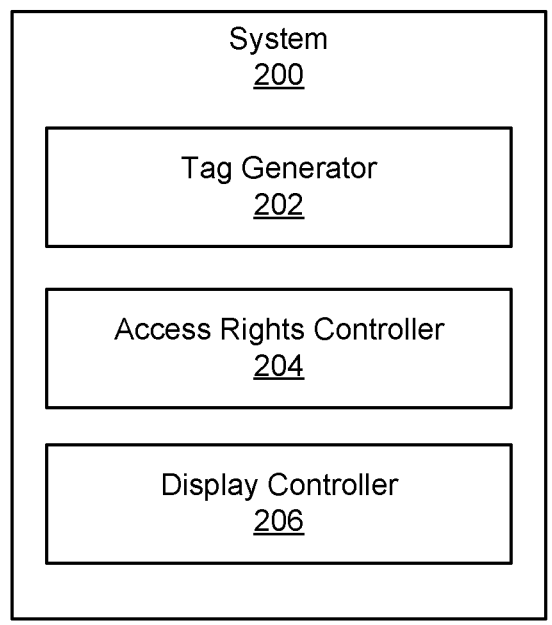
FIG. 2 depicts a system for generating and presenting virtual reality object tags, according to an example of the principles described herein.

FIG. 2 depicts a system (200) for generating and presenting virtual reality object tags, according to an example of the principles described herein. To achieve its desired functionality, the system (200) includes various components such as a tag generator (202), access rights controller (204), and display controller (206). Each component may include a combination of hardware and program instructions to perform a designated function. The components may be hardware. For example, the components may be implemented in the form of electronic circuitry (e.g., hardware). Each of the components may include a processor to execute the designated function of the component. Each of the components may include its own processor, but one processor may be used by all the components. For example, each of the components may include a processor and memory. In another example, one processor may execute the designated function of each of the components. The processor may include the hardware architecture to retrieve executable code from the memory and execute the executable code. As specific examples, the components as described herein may include computer readable storage medium, computer readable storage medium and a processor, an application specific integrated circuit (ASIC), a semiconductor-based microprocessor, a central processing unit (CPU), and a field-programmable gate array (FPGA), and/or other hardware device.

The memory may include a computer-readable storage medium, which computer-readable storage medium may contain, or store computer usable program code for use by or in connection with an instruction execution system, apparatus, or device. The memory may take many types of memory including volatile and non-volatile memory. For example, the memory may include Random Access Memory (RAM), Read Only Memory (ROM), optical memory disks, and magnetic disks, among others. The executable code may, when executed by the processor cause the processor to implement at least the functionality of visually and intelligently presenting tags associated with VR objects.

A tag generator (202) may generate a user-specific tag for the VR object that the first user is interacting with, the user-specific tag being based on the interaction. As described above, the tag generator (202) may generate the user-specific tag based on manual input by the user. That is, a user may tag the VR object with any variety of information such as first user opinions of the VR object or characteristics of the VR object. The tag generator (202) may also automatically generate the tags by for example, natural language processing or by monitoring the actions and interactions of the first user with the VR object. As described above, there are a variety of characteristics of the VR object that may be included in a user-specific tag, which characteristics may be determined based on interactions of the first user with the VR object. The tag generator (202) may be fed these characteristics to generate a multifarious tag.

As described above, the accessibility to various user-specific tags may be based on the role of the second user. Accordingly, the system (200) includes an access rights controller (204) which 1) assigns role-based access rights to the user-specific tags and 2) determines a role of the second user of the VR environment.

As described above, role-based access rights may be assigned and roles may be determined from manual user input or may be determined automatically. For example, a first user may specify which individuals, or which roles, are to have access to the user-specific tag generated on behalf of the first user. Similarly, a second user may manually indicate a role such that based on a comparison with the role-based access rights, the second user may be presented with the user-specific tag in the VR environment, or may have the user-specific tag hidden from view.

In another example, access rights and roles may be determined automatically. For example, by processing a hierarchical structure, the access rights controller (204) may allow users from a group authorization to view user-specific tags generated by a user in that group. Still processing that hierarchical structure, the access rights controller (204) may determine that the second user is within the group specified as having access to the user-specific tags of other users in that group. While specific reference is made to hierarchical structure-based analysis, role-based access rights and roles may be determined in other ways as well. For example, the first user may specify a role and a profile file for the second user may indicate the second user's role such that a determination of access may be made. As such, just those identified by a particular role may view the tag. That is, the system (200) provides control over which users and entities can view the tags associated with particular objects.

The system (200) also includes a display controller (206) which generates the VR environment. Specifically, the display controller (208) presents to the second user, the user-specific tags alongside the VR object based on a comparison of the role of the second user and the role-based access rights.

It may be that some tags associated with a VR object or all tags associated with a VR object are hidden while others are displayed, which may be based on the domain and profile of the user or role-based restrictions imposed by the first user. As such, the display controller (206) hides or allows certain tags based on the user that is logged into the system. That is, each user may enter credentials prior to entering a VR environment. From these credentials, the system may identify a profile of the second user which includes role information. Based on the information in the profile, the system (200) may hide or present certain tags.

A particular example is now provided. In this example, a user of an organization may be onloaded into a VR environment. As every organization may have its own VR environment tags to identify the VR environment which they can access, users from a particular organization may be attached to the VR environment for the organization. Accordingly, each user entering the VR environment may see the same VR components and objects which are available for the organization. When a first user enters the VR environment, they may tag the VR objects with user-specific tags for subsequent usage. As a particular example, a first user may enter a tag such as "to be shown to division head" or "to be validated for project A." Again, while particular reference is made to particular tags, different tags may be implemented in accordance with the principles described herein.

When a user with the title division head enters the VR environment, the previously tagged VR object which has the tag "to be shown to division head" may be reviewed by the user with the title division head. That is, user-specific tags that are captured and displayed may be based on the role of the user in the VR environment. Accordingly, just a division head and the person who created the tag may be able to see the tag that indicates the VR object should "be shown to division head." Similarly, the tagged object in a space can be used by other users that visit the VR environment at a latter point in time. In an example, a comparative decision is taken based on the organization preference till date and the choices made by the user currently selecting objects in the VR environment. That is, actions that have been taken in the past may be used to identify a pattern. In an example, the system profiles the tags to generate entities and intents that correspond to the virtual tags thereby enabling contextual searching within the VR environment. The entities and intents convey what those VR objects were used for.

Figure 3:
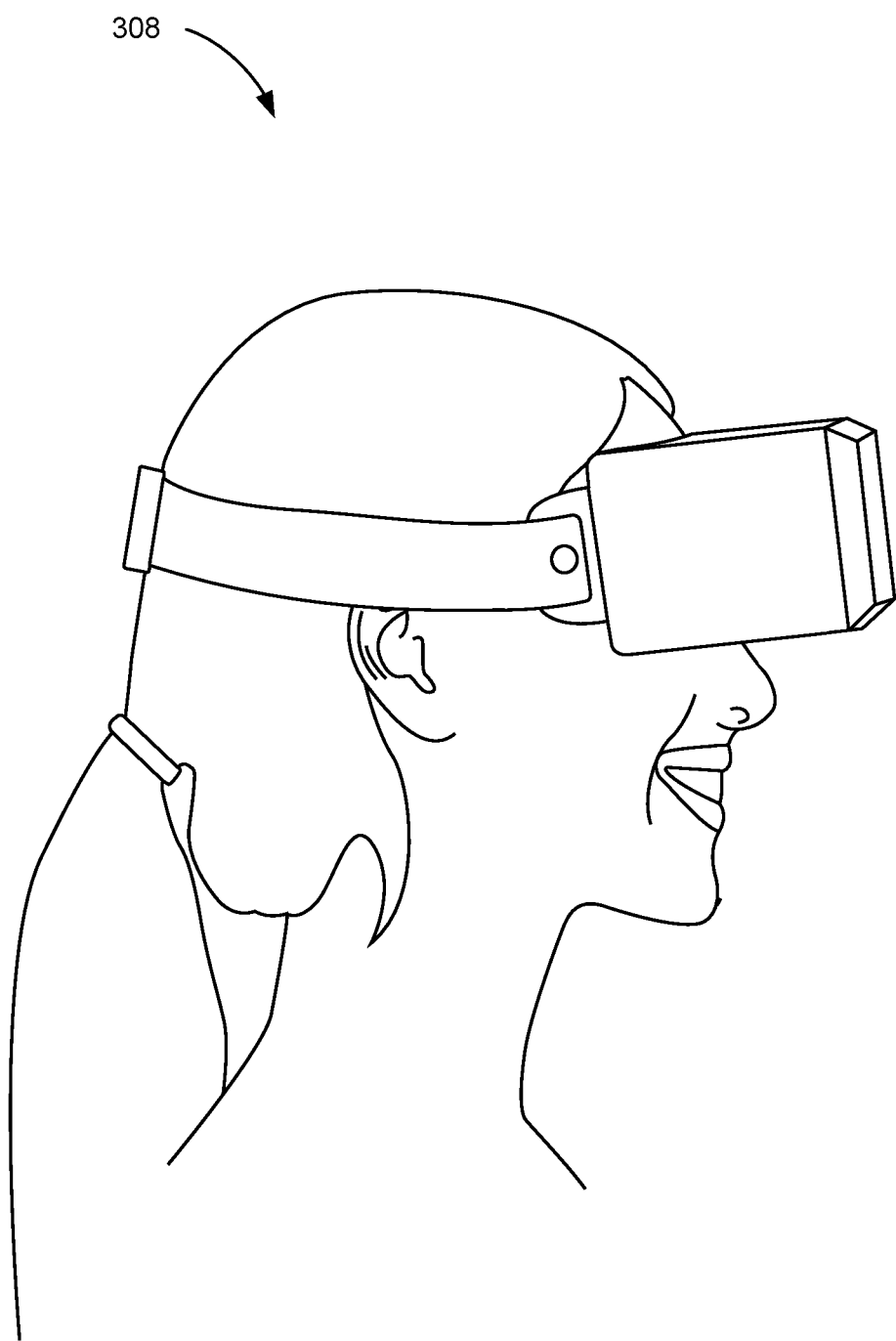
FIG. 3 depicts a wearable virtual reality system through which virtual reality objects and associated tags are presented, according to an example of the principles described herein.

FIG. 3 depicts a wearable VR display system (308) for generating and presenting virtual reality object tags, according to an example of the principles described herein. The system (FIG. 2, 200) depicted in FIG. 2 which generates the tags may be in communication with the VR display system (308). That is, the display controller (FIG. 2, 206) of the system (FIG. 2, 200) may transmit information that allows the VR display system (308) to generate the VR environment, with or without certain tags being presented therein. The VR display system (308) includes an extended reality headset that is worn by a user to generate visual, auditory, and other sensory environments, to detect user input, and to manipulate the environments based on the user input. A VR display system (308) covers the eyes of the user and presents the visual information in an enclosed environment formed by the VR display system (308) housing and the user's face. While FIG. 3 depicts a particular configuration of the VR display system (308), any type of VR display system (308) may be used in accordance with the principles described herein.

In this example, the VR display system (308) is communicatively coupled to a processor and computer readable program code executable by the processor which causes a view of an extended reality environment to be displayed in the VR display system (308). In some examples, the VR display system (308) implements a stereoscopic head-mounted display that provides separate images for each eye of the user. In some examples, the VR display system (308) may provide stereo sound to the user. In an example, the VR display system (308) may include a head motion tracking sensor that includes a gyroscope and/or an accelerometer. The VR display system (308) may also include an eye tracking sensor to track the eye movement of the user of the VR display system (308).

External content such as digital scenes may be provided by the system (FIG. 2, 200). Accordingly, the VR display system (308) may include an input port to receive the external visual content to be displayed on the VR display system (308) from the system (FIG. 2, 200) or may include a wireless connection to the system (FIG. 2, 200) for the generation of VR content and associated user-specific tags.

Figure 4:
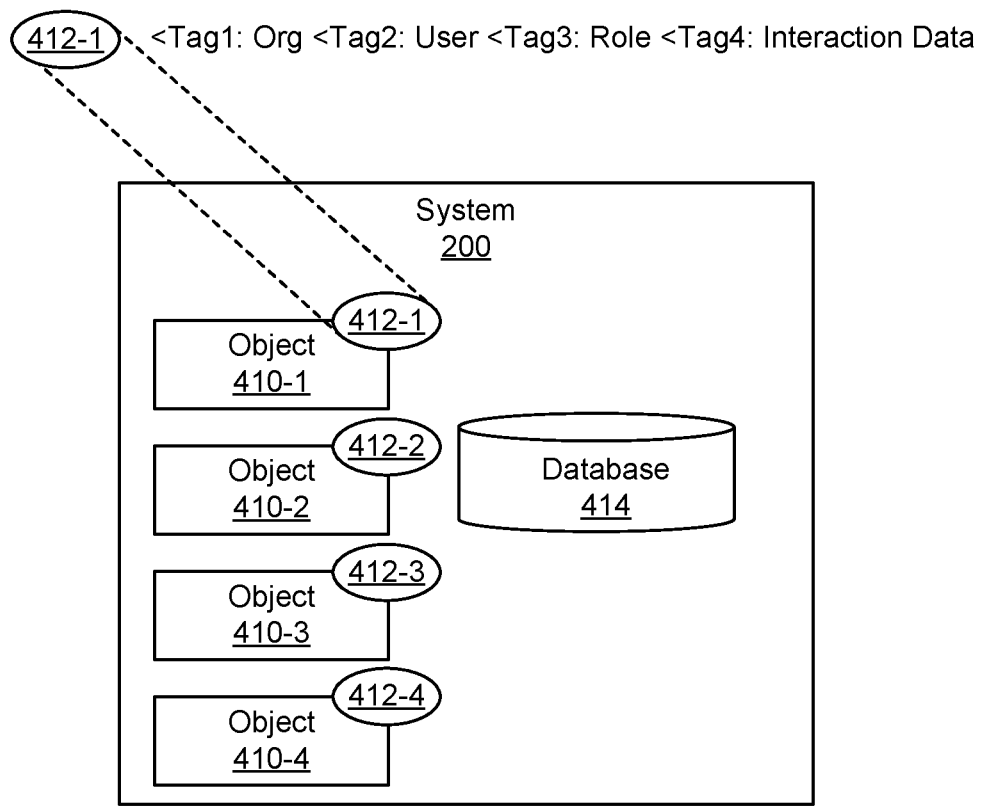
FIG. 4 depicts an environment with virtual reality objects and tags, according to an example of the principles described herein.

FIG. 4 depicts an environment with virtual reality objects (410) and tags (412), according to an example of the principles described herein. As described above, the system (200) may facilitate the display of various VR objects (410-1, 410-2, 410-3, 410-4) and the display of visual indicia associated with tags (412-1, 412-2, 412-3, 412-4) that have been affixed to the VR objects (410). FIG. 4 depicts a particular example of the format of a tag (412). For example, the tag may include information indicative of an association of the user on whom the tag is based, an identifier of the user on whom the tag is based, a role of the user on whom the tag is based, and interaction data, such as an opinion or observation of VR object (410) from the user or a characteristic of the VR object (410). For example, relating to a product development VR environment, where the VR object (410) relates to a product under development. A first user, who is a product development manager may make an observation that a certain feature of the product should be updated to account for a detected mechanical weakness. In this example, the tag (412-1) for the VR object (410-1) associated with the product may indicate the organization, user identification of the product development manager, title of the product development manager, as well as the observation regarding the detected mechanical weakness. The system (200) may include a database (414) that includes a corpus of all the tags and their associated information, i.e., the observations, characteristics, and/or interactions, as well as the role of the first user such that a second user may be able to view the tag information alongside the VR object (410).

As described above, whether or not a VR tag is presented in the VR environment may be based on the role of 1) the first user on whom the tag is based and 2) the second user who is accessing the VR environment. Accordingly, the system (200) determines which VR tags to visually display based on roles of the users. If a second user does not match the role-based access rights, the associated VR tag is removed from the VR environment, thus protecting information from unauthorized viewers, decluttering the VR environment of irrelevant tags, and increasing throughput by reducing the processing load to process what could be large amounts of VR tags.

Figure 5:
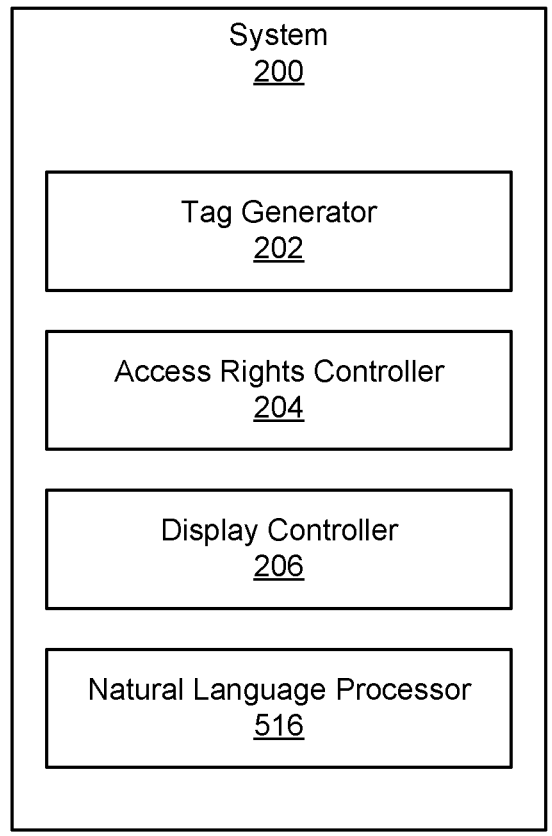
FIG. 5 depicts a system for generating and presenting virtual reality object tags, according to an example of the principles described herein.

FIG. 5 depicts a system (200) for generating and presenting virtual reality object tags (FIG. 4, 412), according to an example of the principles described herein. As described above, the system (200) may include a tag generator (202), access rights controller (204), and display controller (206) as described above. In the example depicted in FIG. 2, the system (200) may include additional components. For example, the system (200) may include a natural language processor (516). The natural language processor (516) may facilitate tag generation and role-based access right assignation. That is, as described above, in some examples tags may be generated based on manual user input and access rights may be assigned based on manual use input. However, in other examples, these operations may be performed automatically, for example by a natural language processor (516).

For example, the natural language processor (516) may analyze an interaction of the first user with the VR object (FIG. 4, 410). That is, as a user interacts with the VR objects (FIG. 4, 410), they may vocalize certain statements which are indicative of their interaction or that are descriptive of the VR object (FIG. 4, 410). The natural language processor (516) may analyze these statements to extract characteristics, opinions, observations, or other information related to the VR object (FIG. 4, 420) which may be associated with a user-specific tag.

As another example, the natural language processor (516) may analyze an interaction to identify a role-based access right. Similarly, as the user interacts with the VR objects (FIG. 4, 410), they may vocalize a role-based access right. This may a specific vocal command to establish a role-based access right, or may be extracted from comments made during VR object (FIG. 4, 410) interaction. In either case, the output of the natural language processor (516) may be passed to the tag generator (202) and/or the access rights controller (204) to support those components in executing their intended functionality.

Figure 6:
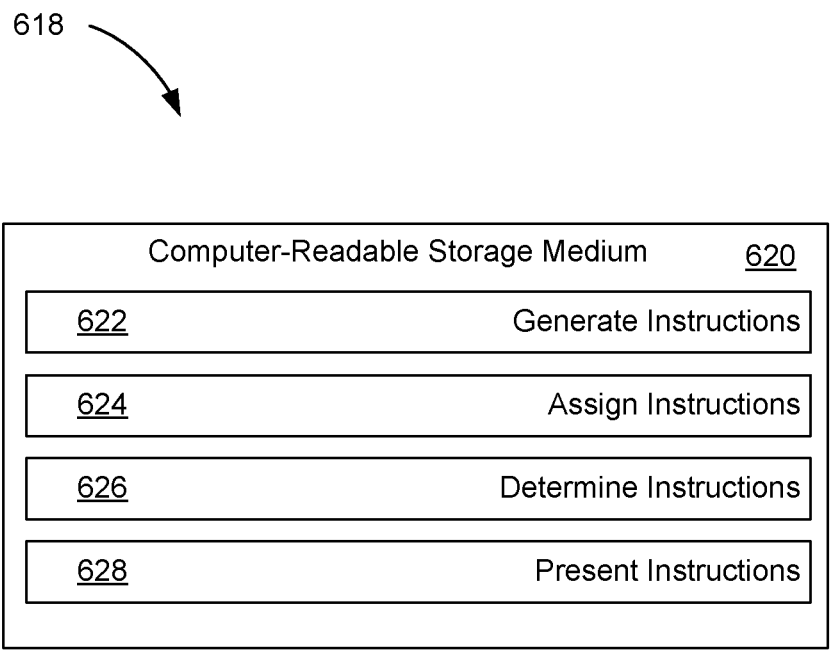
FIG. 6 depicts a computer program product with a computer readable storage medium for generating and presenting virtual reality object tags, according to an example of principles described herein.

FIG. 6 depicts a computer program product (618) with a computer readable storage medium (620) for generating and presenting virtual reality object tags (FIG. 4, 412), according to an example of principles described herein. To achieve its desired functionality, the system (FIG. 2, 200) includes various hardware components. Specifically, the system (FIG. 2, 200) includes a processor and a computer-readable storage medium (620). The computer-readable storage medium (620) is communicatively coupled to the processor. The computer-readable storage medium (620) includes a number of instructions (622, 624, 626, 628) for performing a designated function. The computer-readable storage medium (620) causes the processor to execute the designated function of the instructions (622, 624, 626, 628).

Referring to FIG. 6, generate instructions (622), when executed by the processor, cause the processor to generate a user-specific tag (FIG. 4, 412) for the VR object (FIG. 4, 410) that a first user is interacting with, the user-specific tag (FIG. 4, 412) being based on the interaction. Assign instructions (624), when executed by the processor, may cause the processor to, assign role-based access rights to the user-specific tags (FIG. 4, 412). Determine instructions (626), when executed by the processor, may cause the processor to, determine a role of a second user of the VR environment. Present instructions (628), when executed by the processor, may cause the processor to, responsive to authentication of the second user, present the user-specific tags (FIG. 4, 412) associated with the VR object (FIG. 4, 410) alongside the VR object (FIG. 4, 410).

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. In one example, the computer usable program code may be embodied within a computer readable storage medium; the computer readable storage medium being part of the computer program product. In one example, the computer readable storage medium is a non-transitory computer readable medium.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising: generating user-specific tags for a virtual reality (VR) object displayed within a VR environment, wherein the user-specific tags are manually generated based on user input of a first user and automatically generated based on one or more interactions of the first user with the VR object and one or more other users, wherein the generated user-specific tags comprise one or more VR object properties, associated real-world object properties, types and context of user interactions with the VR object, environmental conditions associated with the VR object, and situational characteristics of the VR object;

assigning role-based access rights to the user-specific tags manually and automatically, wherein the role-based access rights are dynamically determined based on a domain of the first user and a second user, a relationship between the first user and the second user, user input of the first user, and natural language processing;

determining a role of the second user accessing the VR environment; and presenting to the second user, the user-specific tags alongside the VR object based on a comparison of the role of the second user and the role-based access rights.

2. The computer-implemented method of claim 1, wherein a user-specific tag is presented to the second user at a later point in time than when the first user is accessing the VR environment.

3. The computer-implemented method of claim 1, wherein a user-specific tag is presented to the second user based on a profile of the second user.

4. The computer-implemented method of claim 1, wherein a user-specific tag is generated based on a profile of the first user.

5. The computer-implemented method of claim 1, wherein assigning the role-based access rights comprises receiving, from the first user, an indication of a user allowed access to the user-specific tags.

6. The computer-implemented method of claim 5, wherein, responsive to the second user being identified as the user allowed access to a user-specific tag, presenting the user-specific tag within the VR environment.

7. The computer-implemented method of claim 5, wherein, responsive to the second user being identified as a user not allowed access to a user-specific tag, hiding the user-specific tag within the VR environment.

8. A system, comprising: a tag generator to generate user-specific tags for a virtual reality (VR) object displayed within a VR environment, wherein the user-specific tags are manually generated based on user input of a first user and automatically generated based on one or more interactions of the first user with the VR object and one or more other users, wherein the generated user-specific tags comprise one or more VR object properties, associated real-world object properties, types and context of user interactions with the VR object, environmental conditions associated with the VR object, and situational characteristics of the VR object;

an access rights controller: assign role-based access rights to the user-specific tags manually and automatically, wherein the role-based access rights are dynamically determined based on a domain of the first user and a second user, a relationship between the first user and the second user, user input of the first user, and natural language processing;

and determine a role of the second user of a VR environment; and a display controller to present to the second user, the user-specific tags alongside the VR object based on a comparison of the role of the second user and the role-based access rights.

9. The system of claim 8, wherein the display controller is to present a user-specific tag responsive to the VR object coming within view of the second user within the VR environment.

10. The system of claim 8, further comprising a natural language processor to analyze an interaction of the first user with the VR object.

11. The system of claim 8, wherein the access rights controller generates the role-based access rights based on a hierarchical structure of an organization.

12. A computer program product, the computer program product comprising a non-transitory computer readable storage medium having program instructions embodied therewith, the program instructions executable by a processor, to cause the processor to: generate user-specific tags for a virtual reality (VR) object displayed within a VR environment, wherein the user-specific tags are manually generated based on user input of a first user and automatically generated based on one or more interactions of the first user with the VR object and one or more other users, wherein the generated user-specific tags comprise one or more VR object properties, associated real-world object properties, types and context of user interactions with the VR object, environmental conditions associated with the VR object, and situational characteristics of the VR object;

assign role-based access rights to the user-specific tag manually and automatically, wherein the role-based access rights are dynamically determined based on a domain of the first user and a second user, a relationship between the first user and the second user, user input of the first user, and natural language processing;

determine a role of the second user of a VR environment; and responsive to authentication of the second user, present the user-specific tag associated with the VR object alongside the VR object.

13. The computer program product of claim 12, wherein the user-specific tag is specific to an organization to which the first user and the second user pertain.

14. The computer program product of claim 12, wherein the user-specific tag is specific to the VR environment.

* * * * *